(12) United States Patent  
Rajaram et al.

(10) Patent No.: US 8,548,940 B1  
(45) Date of Patent: Oct. 1, 2013

(54) SYSTEM, METHOD AND COMPUTER PROGRAM PRODUCT FOR EXECUTING RECALL ACTIONS WITH RESPECT TO AN APPROVAL PROCESS IN A MULTI-TENANT AN ON-DEMAND DATABASE SERVICE

(75) Inventors: Varadarajan Rajaram, San Francisco, CA (US); Emily Alane Liggett, San Mateo, CA (US); George Hart, Oakland, CA (US); Sriram Gopalan, Foster City, CA (US); Wendy Chang, San Francisco, CA (US)

(73) Assignee: salesforce.com, inc., San Francisco, CA (US)

( * ) Notice: Subject to any disclaimer, the term of this patent is extended or adjusted under 35 U.S.C. 154(b) by 54 days.

(21) Appl. No.: 12/557,409

(22) Filed: Sep. 10, 2009

Related U.S. Application Data

(60) Provisional application No. 61/096,549, filed on Sep. 12, 2008.

(51) Int. Cl.  
*G06F 17/30* (2006.01)

(52) U.S. Cl.  
USPC .......................... 707/608; 707/684; 705/7.27

(58) Field of Classification Search  
USPC ............ 707/609, 944, 999.2, 608; 705/7.27, 705/301  
See application file for complete search history.

(56) References Cited

U.S. PATENT DOCUMENTS

| | | | |
|---|---|---|---|
| 7,209,929 B2 | 4/2007 | Dominguez, Jr. et al. | .... 707/103 |
| 7,698,160 B2 | 4/2010 | Beaven et al. | |
| 8,082,301 B2 | 12/2011 | Ahlgren et al. | |
| 8,095,413 B1 | 1/2012 | Beaven | |
| 8,095,594 B2 | 1/2012 | Beaven et al. | |
| 8,275,836 B2 | 9/2012 | Beaven et al. | |
| 2003/0233404 A1 | 12/2003 | Hopkins | ........................ 709/203 |
| 2004/0133876 A1* | 7/2004 | Sproule | ........................ 717/105 |
| 2005/0049899 A1* | 3/2005 | Lu et al. | ............................ 705/5 |
| 2005/0065925 A1 | 3/2005 | Weissman et al. | ................. 707/4 |
| 2005/0223022 A1 | 10/2005 | Weissman et al. | ............. 707/102 |
| 2005/0283478 A1 | 12/2005 | Choi et al. | ........................ 707/9 |
| 2006/0206834 A1 | 9/2006 | Fisher et al. | .................. 715/777 |
| 2008/0010243 A1 | 1/2008 | Weissman et al. | ................. 707/2 |
| 2009/0006267 A1* | 1/2009 | Fergusson et al. | .......... 705/36 R |

OTHER PUBLICATIONS

U.S. Appl. No. 60/828,192, filed Oct. 4, 2006.  
Gerhardt, David, "Creating a Custom Approval Workflow for SharePoint Server 2007 Using SharePoint Designer 2007," msdn, Jun. 2008, pp. 1-8, retrieved from http://msdn.microsoft.com/en-us/library/cc627286.  
Tisseghem, Patrick, "Building Simple Custom Approval Workflows with InfoPath 2007 Forms," msdn, Jul. 2007, pp. 1-5, retrieved from http://msdn.microsoft.com/en-us/library/bb629921.  
Microsoft, "Microsoft Office SharePoint Server 2007: Evaluation Guide," Feb. 2007, pp. 1-110.  
New Instruction, "Microsoft® Office SharePoint Server (MOSS) 2007 Workflows Quick Reference," 2007, pp. 1-3.

\* cited by examiner

*Primary Examiner* — Thu-Nguyet Le  
(74) *Attorney, Agent, or Firm* — Zilka-Kotab, PC

(57) ABSTRACT

In accordance with embodiments, there are provided mechanisms and methods for recalling execution of an approval process on a data object. These mechanisms and methods for recalling execution of an approval process on a data object can enable actions to be automatically performed in association with the recall of the execution of the approval process on the data object. Thus, manual initiation of actions associated with a recall may be avoided.

18 Claims, 5 Drawing Sheets

SYSTEM, METHOD AND COMPUTER PROGRAM PRODUCT FOR EXECUTING RECALL ACTIONS WITH RESPECT TO AN APPROVAL PROCESS IN A MULTI-TENANT AN ON-DEMAND DATABASE SERVICE

CLAIM OF PRIORITY

This application claims the benefit of U.S. Provisional Patent Application 61/096,549 entitled "Method and System for Providing Cross Object Workflow in an On Demand Service," by Porro et al., filed Sep. 12, 2008, the entire contents of which are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The current invention relates generally to recalling approval processes, and more particularly to performing actions to recall approval processes.

BACKGROUND

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

In conventional database systems, data objects are oftentimes submitted for approval prior to distribution, use, etc. of such data objects. For example, data objects are many times required to be approved by an administrator when such data objects are created, modified, etc. However, in some cases the submission of the data object for approval is desired to be recalled (e.g. for removing the data object from an approval process, etc.).

Unfortunately, traditional techniques for recalling an approval of a data object have generally been limited. For example, in the past, approval process recalls on data objects have been incapable of automatically initiating actions. Thus, any actions to be performed with respect to recall of an approval process have been required to be performed manually (e.g. by an administrator, by a user, etc.).

BRIEF SUMMARY

In accordance with embodiments, there are provided mechanisms and methods for recalling execution of an approval process on a data object. These mechanisms and methods for recalling execution of an approval process on a data object can enable actions to be automatically performed in association with the recall of the execution of the approval process on the data object. Thus, manual initiation of actions associated with a recall may be avoided.

In an embodiment and by way of example, a method is provided for recalling execution of an approval process on a data object. In use, a request is received from a tenant of a multi-tenant on-demand database service to recall execution of an approval process on a data object. Further, at least one recall action is automatically executed in response to the request.

While the present invention is described with reference to an embodiment in which techniques for recalling execution of an approval process on a data object are implemented in an application server providing a front end for a multi-tenant database on-demand service, the present invention is not limited to multi-tenant databases or deployment on application servers. Embodiments may be practiced using other database architectures, i.e., ORACLE®, DB2® and the like without departing from the scope of the embodiments claimed.

Any of the above embodiments may be used alone or together with one another in any combination. Inventions encompassed within this specification may also include embodiments that are only partially mentioned or alluded to or are not mentioned or alluded to at all in this brief summary or in the abstract. Although various embodiments of the invention may have been motivated by various deficiencies with the prior art, which may be discussed or alluded to in one or more places in the specification, the embodiments of the invention do not necessarily address any of these deficiencies. In other words, different embodiments of the invention may address different deficiencies that may be discussed in the specification. Some embodiments may only partially address some deficiencies or just one deficiency that may be discussed in the specification, and some embodiments may not address any of these deficiencies.

DETAILED DESCRIPTION

General Overview

Systems and methods are provided for recalling execution of an approval process on a data object.

To date, execution of an approval process on a data object has been recalled by a user manually initiating each specific recall action desired. Thus, systems and methods are provided for recalling execution of an approval process on a data object, where recall actions are automatically performed in response to a request to recall an approval process, thereby preventing the manual initiation of each specific recall action desired to be executed.

Next, systems and methods are provided for recalling execution of an approval process on a data object will be described with reference to exemplary embodiments.

Figure 1:
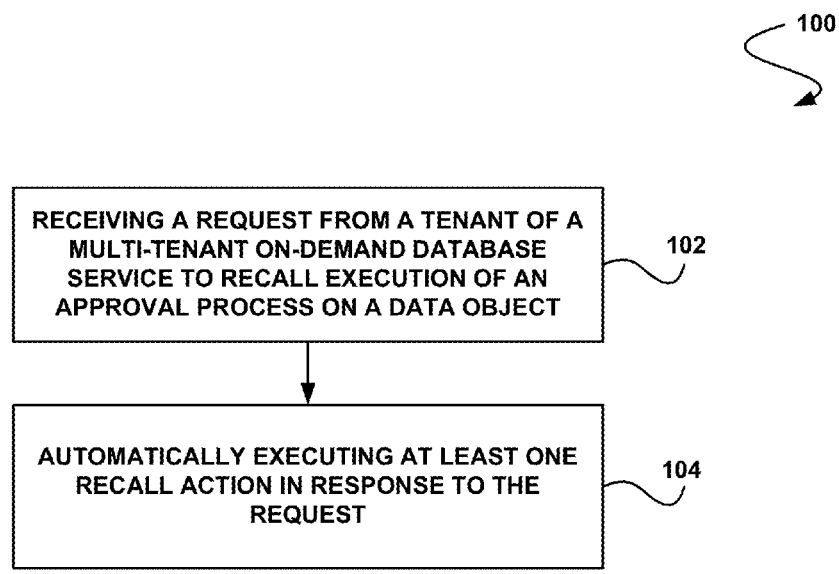
FIG. 1 shows a method for recalling execution of an approval process on a data object, in accordance with one embodiment.

FIG. 1 shows a method 100 for recalling execution of an approval process on a data object, in accordance with one embodiment. As shown in operation 102, a request is received from a tenant of a multi-tenant on-demand database service to recall execution of an approval process on a data object.

With respect to the present description, the multi-tenant on-demand database service may include any service that relies on a database system that is accessible over a network, in which various elements of hardware and software of the database system may be shared by one or more tenants. For instance, a given application server may simultaneously process requests for a great number of customers, and a given database table may store rows for a potentially much greater number of customers. Various examples of such a multi-tenant on-demand database service will be set forth in the context of different embodiments that will be described during reference to subsequent figures.

To this end, the tenant of the multi-tenant on-demand database service from which the recall request is received may include any customer, organization, group, user, etc. of the multi-tenant on-demand database service. Further, the recall request may be received by the multi-tenant on-demand database service from the tenant over a network. Optionally, an interface (e.g. user interface) of the multi-tenant on-demand database service may be utilized by the tenant for submitting the request to recall the execution of the approval process on the data object.

Additionally, the data object for which the recall of the approval process is requested may include any type of data object on which execution of an approval process may be recalled. For example, the data object may include a report, a record (e.g. of a database), etc. Optionally, the data object may be stored using the multi-tenant on-demand database service (e.g. in a database of the multi-tenant on-demand database service). In one embodiment, the data object may be stored for use by at least one tenant of the multi-tenant on-demand database service.

In one embodiment, the approval process being executed on the data object may include a submission of the data object to an administrator (e.g. via a notification to the administrator, etc.) for manual approval of the data object by the administrator. In another embodiment, the approval process may include updating a status of the data object to indicate that the data object is in the process of being approved (e.g. an "In Progress" status). Of course, however, the approval process may include any process whereby the data object is approved.

Accordingly, the requested recall of the approval process being executed on the data object may include any request to suspend, at least temporarily, the approval process being executed on the data object. For example, the recall may be requested by the tenant for allowing the tenant to perform modifications on the data object (e.g. for completing the data object, fixing errors in the data object, etc.). In this way, the recall may be requested for interrupting the approval process being performed on the data object such that even after the approval process on the data object has been initiated, operations on the data object may be performed (e.g. by the tenant) prior to an approval decision being made (e.g. by an administrator).

Further, as shown in operation 104, at least one recall action is automatically executed in response to the request. Thus, upon receipt of the recall request from the tenant, the multi-tenant on-demand database service may automatically perform the recall action. As an option, the recall action(s) that is automatically executed may be predefined for execution when the approval process of the data object is requested to be recalled (e.g. by an administrator, business analyst, etc.). As another option, the recall action(s) may be included as at least part of a recall process performed with respect to the data object. For example, the recall actions may make up a recall process definition for the data object. Still yet, each recall action may be created specifically for use when the data object is recalled, or may be selected from a set of preconfigured recall actions for use when the data object is recalled.

In one embodiment, the recall action may include an action performed on the data object. Thus, as an option, the recall action may be utilized to restore the data object to a prior state. Such prior state may include a state of the data object that existed prior to the initiation of the approval process on the data object.

For example, the recall action may include unlocking the data object. The data object may optionally be unlocked for allowing modifications (e.g. by the tenant) to be made to the data object. In one exemplary embodiment, the data object may be locked during execution of the approval process on the data object (e.g. as an action performed as a part of the approval process) such that modifications to the data object may be prevented during execution of the approval process on the data object, and the data object may further be automatically unlocked as a recall action performed on the data object in response to a request to recall the approval process.

As another example, the recall action may include updating data included in the data object. In an embodiment where the data object includes a record, the recall action may include updating a field of the record. Further, the data in the data object may be updated to include predefined data (e.g. a predefined value, etc.).

As yet another example, the recall action may include updating a status of the data object. As noted above, the approval process may include updating a status of the data object to indicate that the data object is in the process of being approved (e.g. an "In Progress" status). Similarly, the recall action may include updating the status of the data object to indicate that the data object is not in the process of being approved (e.g. a "Not Submitted" status).

As a further example, the recall action may include updating data included in a parent object of the data object. Such parent object may have a parent-child relationship with the data object, for example. In an embodiment where the data object includes a record, the recall action may include updating a field of a parent record of the record.

In another embodiment, the recall action may include an action performed in association with the data object. For example, the recall action may include issuing a notification (e.g. email alert, etc.) of the recall of the approval processing being performed on the data object. Optionally, the notification may be issued to an administrator that was to approve of the data object during the approval process (e.g. for notifying the administrator of the recall, etc.).

As another example, the recall action may include creating a task for a user and assigning the task to the user (e.g. via an inbox of the user). Optionally, the user may be associated with the tenant from which the recall was requested. As another option, the task may be an instruction to perform a specific action with respect to the data object (e.g. fix an error, etc.).

As yet another example, the recall action may include sending a message to a third party system. The third party system may include any system that is separate from the multi-tenant on-demand database system. In one embodiment, the message may include a web service call. In another embodiment, the message may include instructions for an action to be performed by the third party system with respect to the data object.

While various examples of recall actions have been described above, it should be noted that the recall action may include any action capable of being automatically performed with respect to a requested recall of the execution of the approval process on the data object. In this way, recall actions may be automatically performed such that manual initiation of each recall action may be prevented from being required when an approval process being performed on a data object is desired to be recalled.

Figure 2:
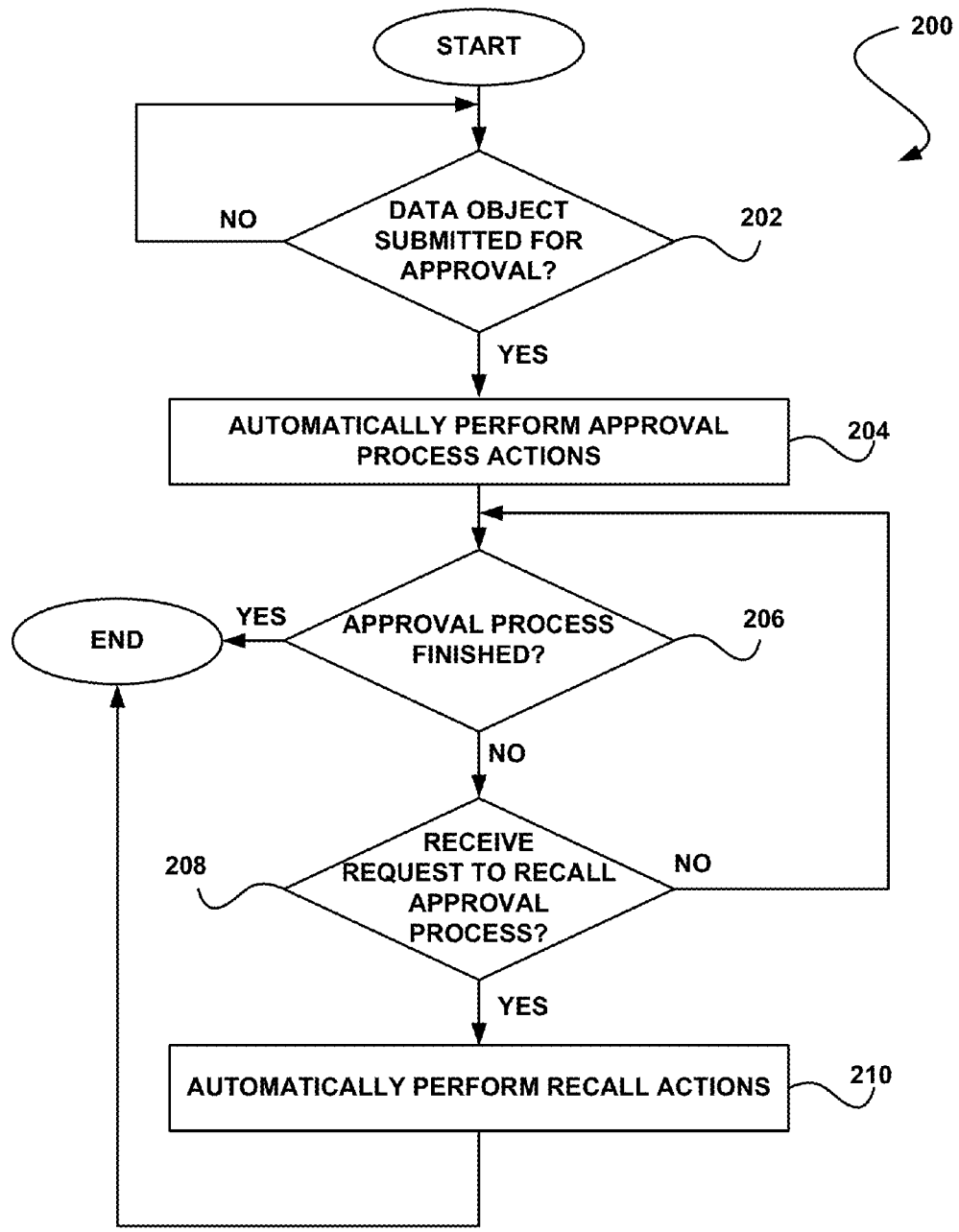
FIG. 2 shows a method for automatically performing recall actions to recall execution of an approval process on a data object, in accordance with another embodiment.

FIG. 2 shows a method 200 for automatically performing recall actions to recall execution of an approval process on a data object, in accordance with another embodiment. As an option, the present method 200 may be carried out in the context of the functionality of FIG. 1. For example, the method 200 may be carried out utilizing the multi-tenant on-demand database service. Of course, however, the method 200 may be carried out in any desired environment. The aforementioned definitions may apply during the present description.

As shown in decision 202, it is determined whether a data object is submitted for approval. In one embodiment, determining whether the data object has been submitted for approval may include determining whether a request for approval of the data object has been received (e.g. by a multi-tenant on-demand database service). Optionally, the data object may be submitted for approval utilizing a user interface of the multi-tenant on-demand database service, such as a user interface specific to management of the data object.

If it is determined that the data object is not submitted for approval, the method 300 waits for a determination that a data object has been submitted for approval. Once it is determined that a data object has been submitted for approval, approval process actions are automatically performed. See operation 204. The approval process actions may include any actions performed during the process of approving the data object. Thus, the approval process may be automatically initiated upon submission of the data object by a tenant or approval.

Just by way of example, the approval process actions may include locking the data object (e.g. for preventing modifications to the data object). As another example, the approval process actions may include updating a status of the data object to reflect that the data object is in the process of being approved. As yet another example, the approval process actions may include sending a notification to an administrator requesting that the administrator approve of the data object. As still yet another example, the approval process actions may include assigning a task to an administrator instructing the administrator to approve of the data object.

Furthermore, it is determined whether the approval process has finished, as shown in decision 206. In the context of the present embodiment, the approval process may be finished once the data object has been approved or disapproved (e.g. by an administrator). Optionally, if the data object has been approved, the data object may be made available for use. As another option, if the data object has be disapproved, a notification may be sent back to the tenant that requested the approval indicating the disapproval of the data object, reasons why the data object was disapproved, instructions for updating the data object which would allow the data object to be approved during a subsequent approval process, etc.

If it is determined that the approval process has finished, the method 300 terminates. If, however, it is determined that the approval process has not finished, it is determined whether a request to recall the approval process has been received. See decision 208. In one embodiment, determining whether the request to recall the approval process has been received may include determining whether the recall request has been received by the multi-tenant on-demand database service. Optionally, the recall request may be submitted utilizing a user interface of the multi-tenant on-demand database service, such as a user interface specific to management of the data object.

If it is determined that the recall request has not been received, the method 300 returns to operation 206 to determine whether the approval process has finished. If it is determined that a recall request has been received, recall actions are automatically performed. See operation 210. The recall actions may include any actions performed with respect to the recall of the approval process of the data object. To this end, the recall actions may make up a recall process performed for recalling the approval process on the data object. For example, the approval process may be terminated, at least temporarily, upon a determination that a recall request has been received.

In one embodiment, the recall actions may include unlocking the data object, such that modifications may be made to the data object. In another embodiment, the recall actions may include updating data included in the data object (e.g. a field of the data object) with predefined data. In yet another embodiment, the recall actions may include updating a status of the data object to indicate that the data object is not in the process of being approved, that the data object has been recalled from the approval process, etc. In yet other embodiments, the recall actions may include issuing a notification of the recall, assigning a task to a user, etc.

As an option, the recall actions may be logged. For example, each recall action may be logged upon completion thereof. In this way, a tenant of the multi-tenant on-demand database service that requested the recall may view the logged recall actions.

Figure 3:
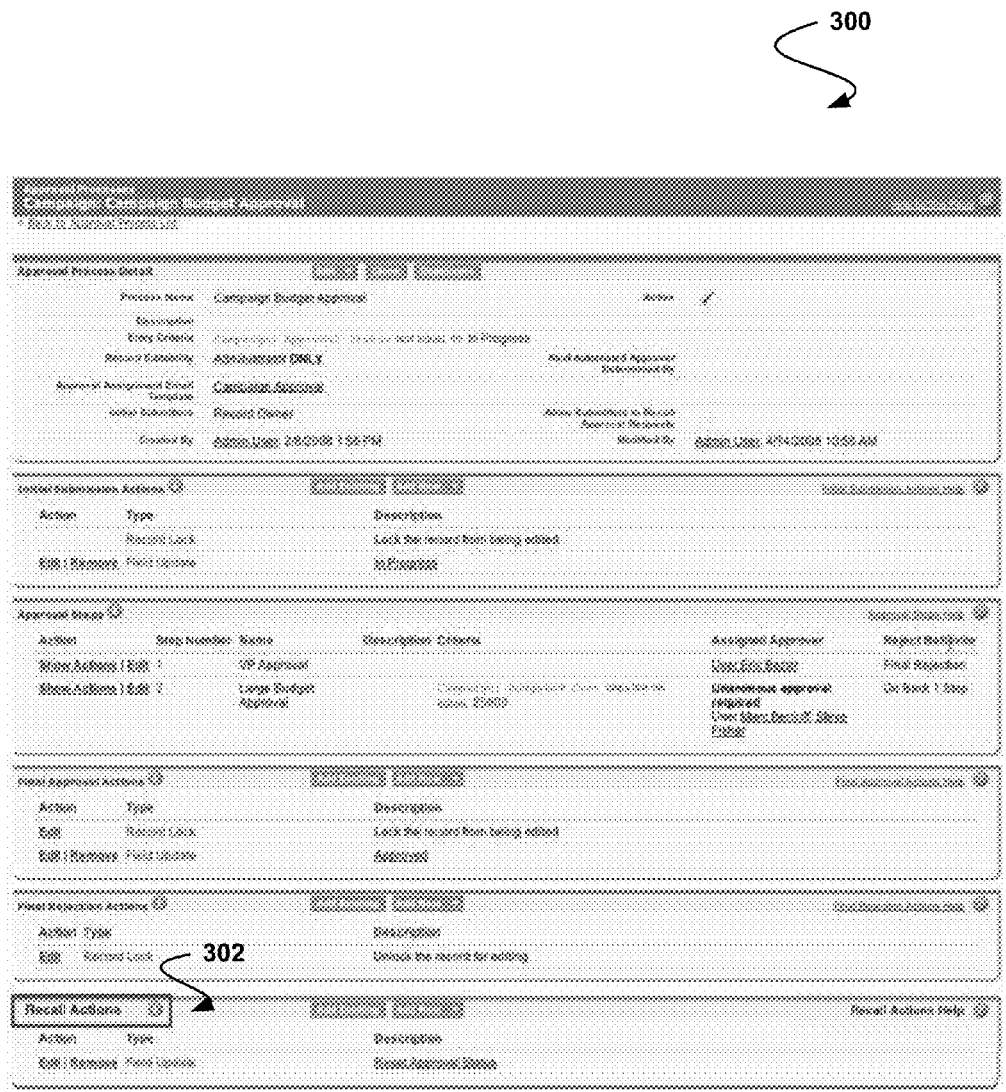
FIG. 3 shows a user interface for configuring recall actions automatically executed when recalling execution of an approval process on a data object, in accordance with yet another embodiment.

FIG. 3 shows a user interface 300 for configuring recall actions automatically executed when recalling execution of an approval process on a data object, in accordance with yet another embodiment. As an option, the user interface 300 may be implemented in the context of the functionality of FIGS. 1-2. For example, the user interface 300 may be provided by the multi-tenant on-demand database service by the multi-tenant on-demand database service. Of course, however, the user interface 300 may be implemented in any desired environment. Again, the aforementioned definitions may apply during the present description.

As shown, the user interface 300 includes configuration options for configuring an approval process of a particular data object (e.g. "Campaign Budget" as shown in the present embodiment). The user interface 300 further includes a recall actions section 302 for configuring recall actions to be automatically executed as part of a recall process upon requesting a recall to execution of the approval process.

The recall actions section 302 allows a user (e.g. administrator, etc.) to add recall actions to a recall process performed upon initiation of recall of the approval process being executed on the data object. In one embodiment, the recall actions may be added by being selected from existing recall actions (e.g. via the "Add Existing" option). For example, the recall actions may be selected from a list of preconfigured recall actions. It should be noted that such existing recall actions may be available for use in configuring a recall process associated with any desired data object. Thus, the existing recall actions may be made available across multiple data objects for use during a recall thereof.

In another embodiment, the recall actions may be added by being manually configured (e.g. via the "Add New" option). Optionally, once a new recall action is manually configured, the recall action may be added to the existing recall actions for use with respect to recalls of other data objects. Adding the newly configured recall action to the existing recall actions may prevent duplicate recall actions from being manually configured (e.g. by preventing an administrator from manually configuring a recall action when the recall action already exists in the existing recall actions).

The recall actions section 302 may be automatically populated with a default recall action, in one embodiment. For example, the default recall action may include unlocking the data object for allowing modification thereof. To this end, the recall process may automatically include the recall action for unlocking the data object, and further recall actions may be added to the recall process by the user.

The recall actions section 302 may also include a help link. Upon selection of the help link by the user, the user may be provided with on-line help. The recall actions section 302 may also include various information links each associated with a different option of the recall actions section 302, which when hovered over by cursor of the user may present the user with text explaining the feature associated with the option.

While not shown, it should be noted that the user interface 300 may also include an option for enabling/disabling the recall process. For example, if the recall process is disabled, the execution of the approval process of the data object may be prevented from being (e.g. may not be allowed to be) recalled. Further, if the recall process is disabled, the recall action section 302 may be hidden, such that the recall actions cannot be configured. It should be noted, however, that an administrator may have sufficient privileges such that the administrators may always recall an approval process. The administrator may also configure any recall process such that the user that submitted the request for approval may also be allowed to recall the approval process.

System Overview

Figure 4:
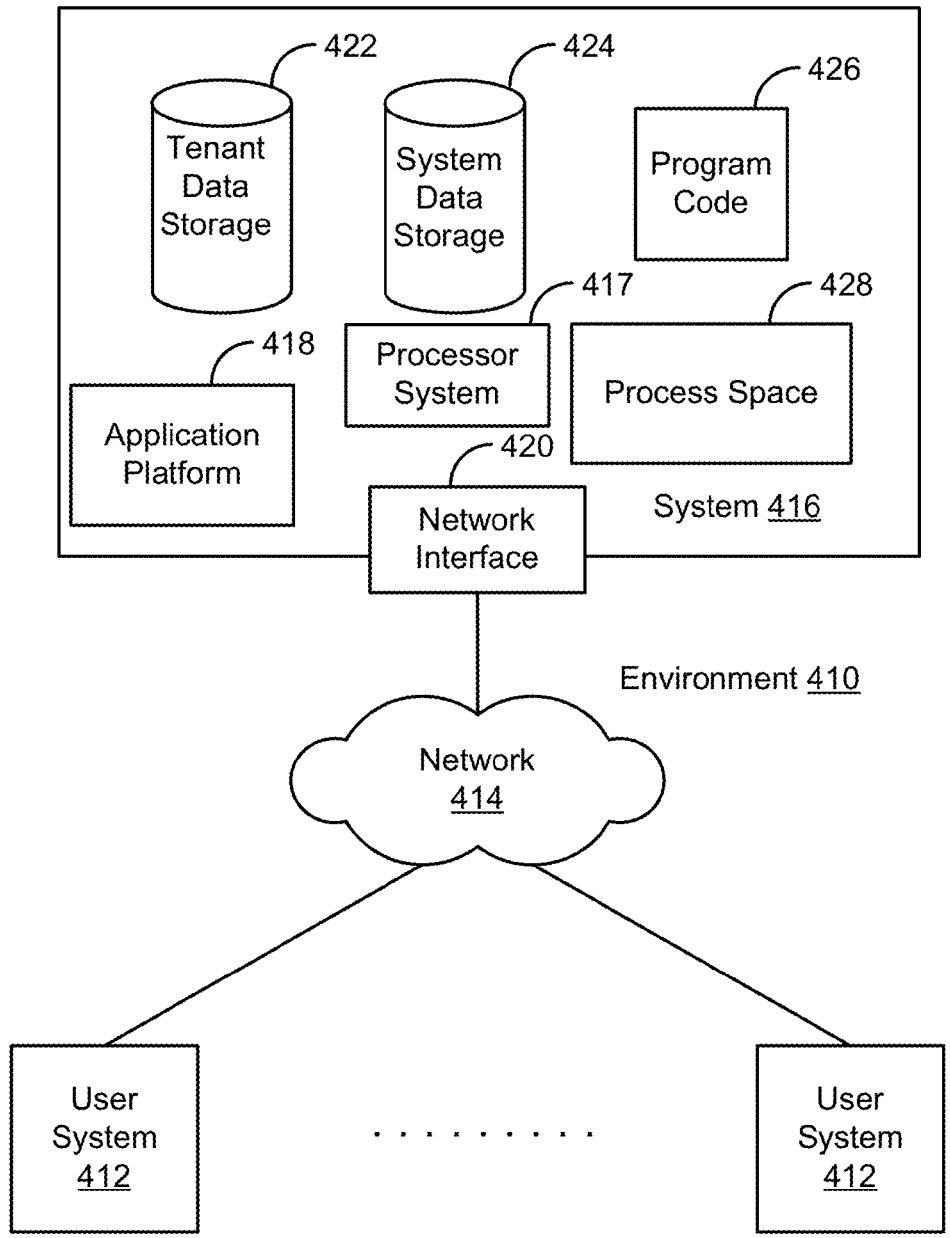
FIG. 4 illustrates a block diagram of an example of an environment wherein an on-demand database service might be used.

FIG. 4 illustrates a block diagram of an environment 410 wherein an on-demand database service might be used. As an option, any of the previously described embodiments of the foregoing figures may or may not be implemented in the context of the environment 410. Environment 410 may include user systems 412, network 414, system 416, processor system 417, application platform 418, network interface 420, tenant data storage 422, system data storage 424, program code 426, and process space 428. In other embodiments, environment 410 may not have all of the components listed and/or may have other elements instead of, or in addition to, those listed above.

Environment 410 is an environment in which an on-demand database service exists. User system 412 may be any machine or system that is used by a user to access a database user system. For example, any of user systems 412 can be a handheld computing device, a mobile phone, a laptop computer, a work station, and/or a network of computing devices. As illustrated in FIG. 4 (and in more detail in FIG. 5) user systems 412 might interact via a network with an on-demand database service, which is system 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS). Accordingly, "on-demand database service 416" and "system 416" will be used interchangeably herein. A database image may include one or more database objects. A relational database management system (RDMS) or the equivalent may execute storage and retrieval of information against the database object(s). Application platform 418 may be a framework that allows the applications of system 416 to run, such as the hardware and/or software, e.g., the operating system. In an embodiment, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

The users of user systems 412 may differ in their respective capacities, and the capacity of a particular user system 412 might be entirely determined by permissions (permission levels) for the current user. For example, where a salesperson is using a particular user system 412 to interact with system 416, that user system has the capacities allotted to that salesperson. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users will have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network, such as the global internetwork of networks often referred to as the "Internet" with a capital "I," that network will be used in many of the examples herein. However, it should be understood that the networks that the present invention might use are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one embodiment, system 416, shown in FIG. 4, implements a web-based customer relationship management (CRM) system. For example, in one embodiment, system 416 includes application servers configured to implement and execute CRM software applications as well as provide related data, code, forms, webpages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain embodiments, system 416 implements applications other than, or in addition to, a CRM application. For example, system 416 may provide tenant access to multiple hosted (standard and custom) applications, including a CRM application. User (or third party developer) applications, which may or may not include CRM, may be supported by the application platform 418, which manages creation, storage of the applications into one or more database objects and executing of the applications in a virtual machine in the process space of the system 416.

Figure 5:
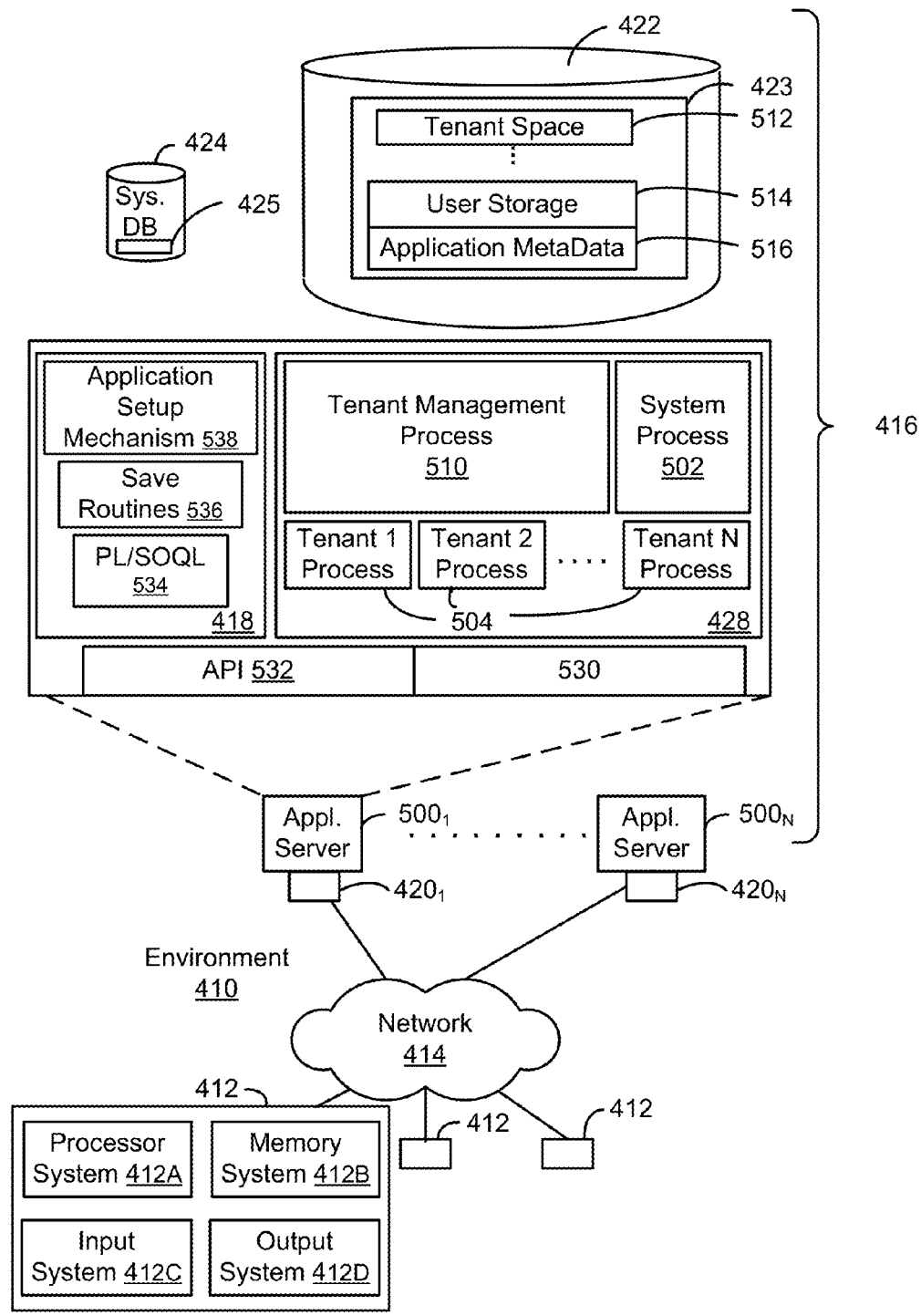
FIG. 5 illustrates a block diagram of an embodiment of elements of FIG. 4 and various possible interconnections between these elements.

One arrangement for elements of system 416 is shown in FIG. 5, including a network interface 420, application platform 418, tenant data storage 422 for tenant data 423, system data storage 424 for system data accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

Several elements in the system shown in FIG. 4 include conventional, well-known elements that are explained only briefly here. For example, each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer browser, Netscape's Navigator browser, Opera's browser, or a WAP-enabled browser in the case of a cell phone, PDA or other wireless device, or the like, allowing a user (e.g. subscriber of the multi-tenant database system) of user system 412 to access, process and view information, pages and applications available to it from system 416 over network 414. Each user system 412 also typically includes one or more user interface devices, such as a keyboard, a mouse, trackball, touch pad, touch screen, pen or the like, for interacting with a graphical user interface (GUI) provided by the browser on a display (e.g. a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, embodiments are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one embodiment, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417 of FIG. 4, which may include an Intel Pentium® processor or the like, and/or multiple processor units. A computer program product embodiment includes a machine-readable storage medium (media) having instructions stored thereon/in which can be used to program a computer to perform any of the processes of the embodiments described herein. Computer code for operating and configuring system 416 to intercommunicate and to process webpages, applications and other data and media content as described herein are preferably downloaded and stored on a hard disk, but the entire program code, or portions thereof, may also be stored in any other non-transitory machine readable medium as is well known, such as a ROM or RAM, or provided on any non-transitory machine readable medium capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of non-transitory machine readable medium suitable for storing instructions and/or data. Additionally, the entire program code, or portions thereof, may be transmitted and downloaded from a software source over a transmission medium, e.g., over the Internet, or from another server, as is well known, or transmitted over any other conventional network connection as is well known (e.g. extranet, VPN, LAN, etc.) using any communication medium and protocols (e.g. TCP/IP, HTTP, HTTPS, Ethernet, etc.) as are well known. It will also be appreciated that computer code for implementing embodiments of the present invention can be implemented in any programming language that can be executed on a client system and/or server or server system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.), According to one embodiment, each system 416 is configured to provide webpages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g. in a server farm located in a single building or campus), or they may be distributed at locations remote from one another (e.g. one or more servers located in city A and one or more servers located in city B). As used herein, each MTS could include one or more logically and/or physically connected servers distributed locally or across one or more geographic locations. Additionally, the term "server" is meant to include a computer system, including processing hardware and process space(s), and an associated storage system and database application (e.g. OODBMS or RDBMS) as is well known in the art. It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 5 also illustrates environment 410. However, in FIG. 5 elements of system 416 and various interconnections in an embodiment are further illustrated. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers $500_1$-$500_N$, system process space 502, tenant process spaces 504, tenant management process space 510, tenant storage area 512, user storage 514, and application metadata 516. In other embodiments, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of one or more processors. Memory system 412B may be any combination of one or more memory devices, short term, and/or long term memory. Input system 412C may be any combination of input devices, such as one or more keyboards, mice, trackballs, scanners, cameras, and/or interfaces to networks. Output system 412D may be any combination of output devices, such as one or more monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as one or more Oracle™ databases.

Application platform 418 includes an application setup mechanism 538 that supports application developers' creation and management of applications, which may be saved as metadata into tenant data storage 422 by save routines 536 for execution by subscribers as one or more tenant process spaces 504 managed by tenant management process 510 for example. Invocations to such applications may be coded using PL/SOQL 534 that provides a programming language style interface extension to API 532. A detailed description of some PL/SOQL language embodiments is discussed in commonly owned U.S. Provisional Patent Application 60/828,192 entitled, "PROGRAMMING LANGUAGE METHOD AND SYSTEM FOR EXTENDING APIS TO EXECUTE IN CONJUNCTION WITH DATABASE APIS," by Craig Weissman, filed Oct. 4, 2006, which is incorporated in its entirety herein for all purposes. Invocations to applications may be detected by one or more system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server $500_1$ might be coupled via the network 414 (e.g., the Internet), another application server $500_{N\ 1}$ might be coupled via a direct network link, and another application server $500_N$ might be coupled by yet a different network connection. Transfer Control Protocol and Internet Protocol (TCP/IP) are typical protocols for communicating between application servers 500 and the database system. However, it will be apparent to one skilled in the art that other transport protocols may be used to optimize the system depending on the network interconnect used.

In certain embodiments, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one embodiment, therefore, an interface system implementing a load balancing function (e.g., an F5 Big-IP load balancer) is communicably coupled between the application servers 500 and the user systems 412 to distribute requests to the application servers 500. In one embodiment, the load balancer uses a least connections algorithm to route user requests to the application servers 500. Other examples of load balancing algorithms, such as round robin and observed response time, also can be used. For example, in certain embodiments, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each salesperson uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a salesperson is visiting a customer and the customer has Internet access in their lobby, the salesperson can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant-specific data, system 416 might also maintain system level data usable by multiple tenants or other data. Such system level data might include industry reports, news, postings, and the like that are sharable among tenants.

In certain embodiments, user systems 412 (which may be client systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., one or more SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to the present invention. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for Account, Contact, Lead, and Opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. patent application Ser. No. 10/817,161, filed Apr. 2, 2004, entitled "CUSTOM ENTITIES AND FIELDS IN A MULTI-TENANT DATABASE SYSTEM," which is hereby incorporated herein by reference, teaches systems and methods for creating custom objects as well as customizing standard objects in a multi-tenant database system. In certain embodiments, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

It should be noted that any of the different embodiments described herein may or may not be equipped with any one or more of the features set forth in one or more of the following published applications: US2003/0233404, titled "OFFLINE SIMULATION OF ONLINE SESSION BETWEEN CLIENT AND SERVER," filed Nov. 4, 2002; US2004/0210909, titled "JAVA OBJECT CACHE SERVER FOR DATABASES," filed Apr. 17, 2003, now issued U.S. Pat. No. 7,209,929; US2005/0065925, titled "QUERY OPTIMIZATION IN A MULTI-TENANT DATABASE SYSTEM," filed Sep. 23, 2003; US2005/0223022, titled "CUSTOM ENTITIES AND FIELDS IN A MULTI-TENANT DATABASE SYSTEM," filed Apr. 2, 2004; US2005/0283478, titled "SOAP-BASED WEB SERVICES IN A MULTI-TENANT DATABASE SYSTEM," filed Jun. 16, 2004; US2006/0206834, titled "SYSTEMS AND METHODS FOR IMPLEMENTING MULTI-APPLICATION TABS AND TAB SETS," filed Mar. 8, 2005; and/or US2008/0010243, titled "METHOD AND SYSTEM FOR PUSHING DATA TO A PLURALITY OF DEVICES IN AN ON-DEMAND SERVICE ENVIRONMENT," filed Jun. 1, 2007; which are each incorporated herein by reference in their entirety for all purposes.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

The invention claimed is:

1. A method, comprising:
receiving a request to initiate an approval process on a data object;
executing the approval process on the data object including locking the data object to prevent modifications to the data object during the execution of the approval process on the data object;
receiving a request from a tenant of a multi-tenant on-demand database service to recall execution of the approval process being performed on the data object, wherein the request is received during the execution of the approval process for interrupting the approval process being performed on the data object;
in response to the request to recall the execution of the approval process, automatically executing at least one recall action to temporarily suspend the execution of the approval process, wherein the execution of the recall action includes unlocking the data object such that even after the approval process on the data object has been initiated, the recall action allows operations on the data object to be performed by the tenant prior to an approval decision associated with the approval process being made, and wherein the execution of the recall action further includes automatically updating data of the data object with predefined data;
receiving a modification to the data object after the unlocking of the data object; and
re-initiating the approval process after receiving the modification to the data object.

2. The method of claim 1, wherein the data object includes a record stored in a database.

3. The method of claim 1, wherein the approval process includes submitting the data object to an administrator for approval of the data object by the administrator.

4. The method of claim 1, wherein the request to initiate the approval process is automatically initiated upon submission of the data object by the tenant for approval.

5. The method of claim 1, wherein the request to recall the execution of the approval process is received utilizing a user interface of the multi-tenant on-demand database service.

6. The method of claim 1, wherein the at least one recall action is utilized to restore the data object to a state of the data object existing prior to initiation of the approval process on the data object.

7. The method of claim 1, wherein the at least one recall action includes updating a status of the data object.

8. The method of claim 1, wherein the at least one recall action includes updating data included in a parent object of the data object.

9. The method of claim 1, wherein the at least one recall action includes issuing a notification of the recall to an administrator.

10. The method of claim 1, wherein the at least one recall action includes creating a task for a user and assigning the task to the user.

11. The method of claim 1, wherein the at least one recall action includes sending a message to a third party system.

12. The method of claim 1, wherein the tenant performs the request to initiate the approval process on the data object, the request to recall the execution of the approval process, and the modification to the data object.

13. The method of claim 1, wherein the at least one recall action to temporarily suspend the execution of the approval process including unlocking the data object is a default recall action automatically configured for execution in response to the request to recall the execution of the approval process, and wherein a user interface specific to the data object and utilized for configuring the approval process of the data object allows a user to configure at least one additional recall action to be automatically executed in response to the request to recall the execution of the approval process.

14. The method of claim 13, wherein the at least one additional recall actions is configured by being selected by the user from a list of preconfigured recall actions available across multiple data objects.

15. The method of claim 13, wherein the at least one additional recall actions is configured by being manually defined by the user, and wherein once the at least one additional recall actions is manually defined by the user the at least one additional recall actions is added to a list of preconfigured recall actions available across multiple data objects.

16. A computer program product embodied on a non-transitory machine readable medium, comprising:

computer code for receiving a request to initiate an approval process on a data object;

computer code for executing the approval process on the data object including locking the data object to prevent modifications to the data object during the execution of the approval process on the data object;

computer code for receiving a request from a tenant of a multi-tenant on-demand database service to recall execution of the approval process being performed on the data object, wherein the request is received during the execution of the approval process for interrupting the approval process being performed on the data object;

computer code for, in response to the request to recall the execution of the approval process, automatically executing at least one recall action to temporarily suspend the execution of the approval process, wherein the execution of the recall action includes unlocking the data object such that even after the approval process on the data object has been initiated, the recall action allows operations on the data object to be performed by the tenant prior to an approval decision associated with the approval process being made, and wherein the execution of the recall action further includes automatically updating data of the data object with predefined data;

computer code for receiving a modification to the data object after the unlocking of the data object; and computer code for re-initiating the approval process after receiving the modification to the data object.

17. An apparatus, comprising:

a processor for:

receiving a request to initiate an approval process on a data object;

executing the approval process on the data object including locking the data object to prevent modifications to the data object during the execution of the approval process on the data object;

receiving a request from a tenant of a multi-tenant on-demand database service to recall execution of the approval process being performed on the data object, wherein the request is received during the execution of the approval process for interrupting the approval process being performed on the data object;

in response to the request to recall the execution of the approval process, automatically executing at least one recall action to temporarily suspend the execution of the approval process, wherein the execution of the recall action includes unlocking the data object such that even after the approval process on the data object has been initiated, the recall action allows operations on the data object to be performed by the tenant prior to an approval decision associated with the approval process being made, and wherein the execution of the recall action further includes automatically updating data of the data object with predefined data;

receiving a modification to the data object after the unlocking of the data object; and re-initiating the approval process after receiving the modification to the data object.

18. The apparatus of claim 17, wherein the processor is coupled to memory via a bus.

* * * * *